United States Patent [19]

Weavil et al.

[11] Patent Number: 5,368,460
[45] Date of Patent: Nov. 29, 1994

[54] BLOWN FILM DIE ENCLOSURE

[75] Inventors: Randy K. Weavil, Winston-Salem; Brian C. Adderton, Advance, both of N.C.

[73] Assignee: R. J. Reynolds Tobacco Company, Winston-Salem, N.C.

[21] Appl. No.: 79,023

[22] Filed: Jun. 17, 1993

[51] Int. Cl.$^5$ ............................................. B29C 47/86
[52] U.S. Cl. .................................. 425/72.1; 425/73; 425/326.1
[58] Field of Search ................ 425/72.1, 73, 326.1, 425/387.1; 264/564, 566

[56] References Cited

U.S. PATENT DOCUMENTS

| | | | |
|---|---|---|---|
| 3,008,186 | 11/1961 | Voigt | 425/326.1 |
| 3,265,789 | 8/1966 | Hofer | 425/326.1 X |
| 3,600,488 | 8/1971 | Yazawa | 425/72.1 X |
| 3,663,134 | 5/1972 | Coquelin | 425/72.1 |
| 4,717,323 | 1/1988 | Karl et al. | 425/72.1 |
| 4,749,346 | 6/1988 | Planeta | 425/72.1 |
| 4,818,467 | 4/1989 | Audureau et al. | 425/72.1 X |

Primary Examiner—Richard L. Chiesa
Attorney, Agent, or Firm—Grover M. Myers

[57] ABSTRACT

An enclosure is disclosed for minimizing or eliminating the effect of uncontrolled air currents and temperature gradients on a blown film bubble emerging from the die of a blown film extruder. The enclosure includes a flexible, transparent shroud supported by a support frame in a substantially cylindrical shape, tapering down to a frusto-conical shape adjacent the extruder head. The lower edge of the shroud is releasably affixed to an annular platform mounted adjacent to the extruder head in coaxial alignment therewith. Sections of the annular platform and shroud support frame are hinged to enable easier access to the die and extruder head.

23 Claims, 2 Drawing Sheets

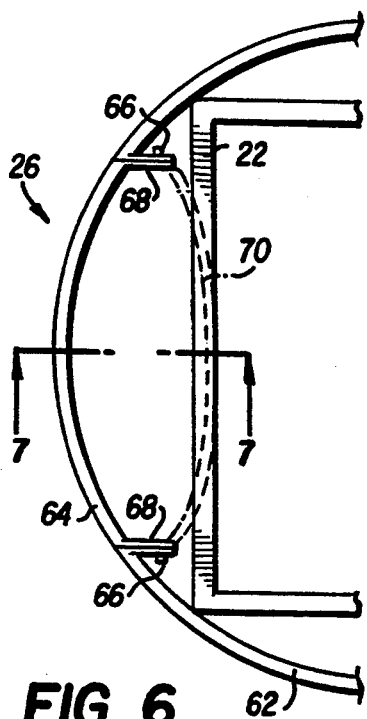
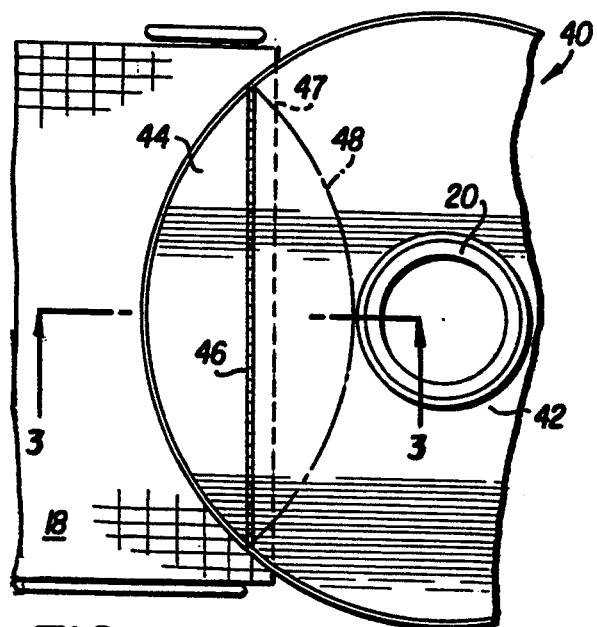
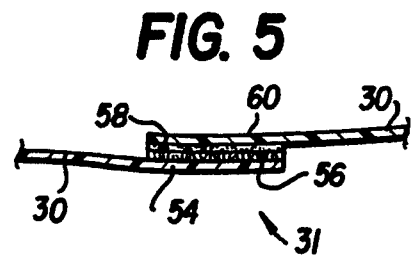
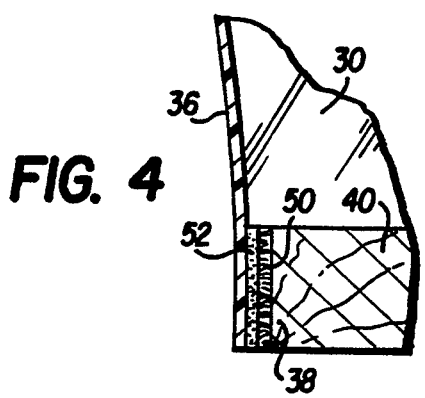
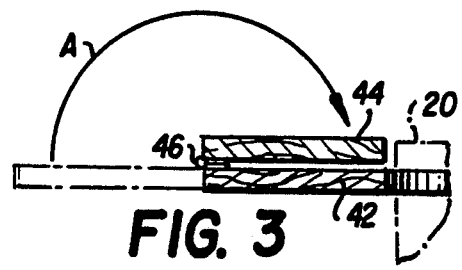
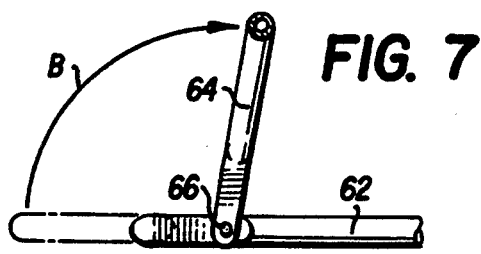

BLOWN FILM DIE ENCLOSURE

FIELD OF THE INVENTION

The present invention relates to the manufacture of blown films, and more particularly to an enclosure structure for protecting a blown or extruded film from uncontrolled airflows and thermal gradients as it emerges from an extrusion die.

BACKGROUND OF THE INVENTION

Blown polymeric film structures used, for example, in the packaging arts, are formed by extruding or coextruding continuous single-layer to seven-layer polymeric films through a blown film extruder in a form known in the art as a "bubble." The extruding process generally includes the introduction of a flow of molten polymer to an extruder head, the polymer flow then being directed through the head under controlled heat and pressure conditions to an adjustable annular or other shape die gap. In some types of blown film apparatus, die oscillation systems evenly distribute the molten polymer at the extruder head. The emerging polymer begins to solidify into a tubular structure or bubble which is cooled by a pressurized air flow from a cooling ring adjacent to the extruder head, followed by longitudinal haul-off of the bubble in the direction of the extrusion output. Generally, such haul-off followed by wind-up of the film onto a roll is directed in a vertically upward direction so as to compensate for or eliminate gravitational effects on the film as it solidifies prior to reaching the wind-up apparatus.

An important problem in the art to which this invention is directed is uncontrolled variations in finished film thickness which undesirably affect the finished quality of the blown film. Such uncontrolled thickness variations are nonuniformities which may undesirably affect the overall quality of those products and goods which are manufactured from the film. In particular, it has been found that one such nonuniformity known as standing gauge bands results from convective updrafts caused by heat radiating in a relatively uncontrolled manner from the extruder apparatus, notwithstanding the use of the various die oscillation systems.

One approach to reducing such nonuniformities in blown film manufacturing includes the mounting of an enclosure having a square cross-section about the extruder head and extending vertically upwardly around the bubble or extrusion output. This enclosure has provided less than satisfactory results because of air turbulence in the corners of the enclosure created by air from the air cooling ring. This turbulence results in different cooling patterns inside the enclosure. In addition, the prior art enclosure provides no barrier to the heat generated by the die and the extruder beneath the enclosure. The result is relatively hot and cold regions in the enclosure and irregular and uncontrolled air flow thereby causing variations in film thickness.

SUMMARY OF THE INVENTION

It is therefore an object of the present invention to substantially eliminate nonuniformities, especially thickness variations, in continuous blown film.

It is another object of the present invention to provide an enclosure structure for minimizing or eliminating uncontrolled air currents to the extruded blown film bubble as it is directed in an upward direction from the extrusion die and for minimizing or eliminating thermally-generated non-uniformities in the film as it cools and solidifies prior to reaching the wind-up apparatus.

It is a further object of the present invention to provide an enclosure structure which accomplishes the foregoing objectives yet enables ready access to the extrusion die and related apparatus.

The present invention is an enclosure structure for minimizing or eliminating the adverse effect of uncontrolled air currents on unsolidified blown film bubbles, such air currents being generated both by environmentally generated air flows and by the high operating temperatures of the extruder apparatus. More particularly, the structure of the invention includes a flexible, transparent shroud supported by and draped about a vertically extending shroud support frame. The lower edge of the shroud extends downwardly below the lower edge of the support frame to an annular platform mounted adjacent to the extruder die head in coaxial alignment therewith. The enclosure shroud is slidably supported at the top edge of the support frame by an upper circular support bar and is maintained in a substantially cylindrical shape by a lower circular support bar of the same diameter as the upper support bar and also in coaxial alignment therewith. The shroud extends from the lower circular support bar to the outer diameter of the annular platform in a generally frusto-conical shape, the lower shroud edge extending to and being removably affixed to the outer circumferential edge of the annular platform.

The annular platform is comprised of a relatively rigid, heat insulative material, such as plywood, particle board or the like, and includes a hinged panel portion for allowing close-in access to the extruder apparatus, especially the extrusion die. Likewise, the lower circular support bar also includes a hinged bar section for enabling closer access to the extrusion head, e.g., during set-up or adjustment of the die. The shroud includes a reclosable seam running the full vertical extent thereof through which the extrusion head may be easily accessed.

In operation, the hinged panel portion and hinged bar section are fully extended into complete annular structures. After the shroud is fully extended so as to be completely wrapped about the full circumferential extent of the coaxially-aligned support bars, the vertical seam is then fully closed along its entire extent and the bottom edge of the shroud is affixed about the full circumferential edge of the annular platform, thereby isolating the region above the platform from convective air currents generated by heat from the extruder apparatus and from environmentally generated air currents. In addition, the substantially uniform distance between the shroud walls and the air cooling ring substantially eliminates nonuniform air currents generated inside the shroud by the air cooling ring.

With the foregoing and other objects, advantages, and features of the invention that will become hereinafter apparent, the nature of the invention may be more clearly understood by reference to the following detailed description of the invention, the appended claims, and to the several views illustrated in the drawings.

BRIEF DESCRIPTION OF THE DRAWINGS

FIG. 2 is a top plan view, partly broken, of the enclosure structures viewed from a plane along line 2—2 of FIG. 1, showing the hinged annular platform positioned adjacent to the extruder head in its fully open position;

FIG. 3 is a cross-sectional view, partly broken, taken along line 3—3 of FIG. 2, showing the hinged annular platform in its folded position to provide access to the extruder head;

FIG. 4 is a cross-sectional view, partly broken, taken along line 4—4 of FIG. 1, showing the arrangement of the lower shroud edge secured to the circumferential edge of the annular platform;

FIG. 5 is a cross-sectional view, partly broken, taken along line 5—5 of FIG. 1, showing the arrangement of the overlapping vertical shroud edges into a closed seam at an intermediate vertical extent of the enclosure;

FIG. 6 is a top plan view, partly broken, as viewed from a plane along line 6—6 of FIG. 1, showing a hinged bar section of the lower circular support bar of the enclosure frame; and FIG. 7 is a cross-sectional view, partly broken, taken along line 7—7 of FIG. 6, showing the hinged bar section in its raised position for providing access to the extruder head.

DETAILED DESCRIPTION OF A PREFERRED EMBODIMENT

Figure 1:
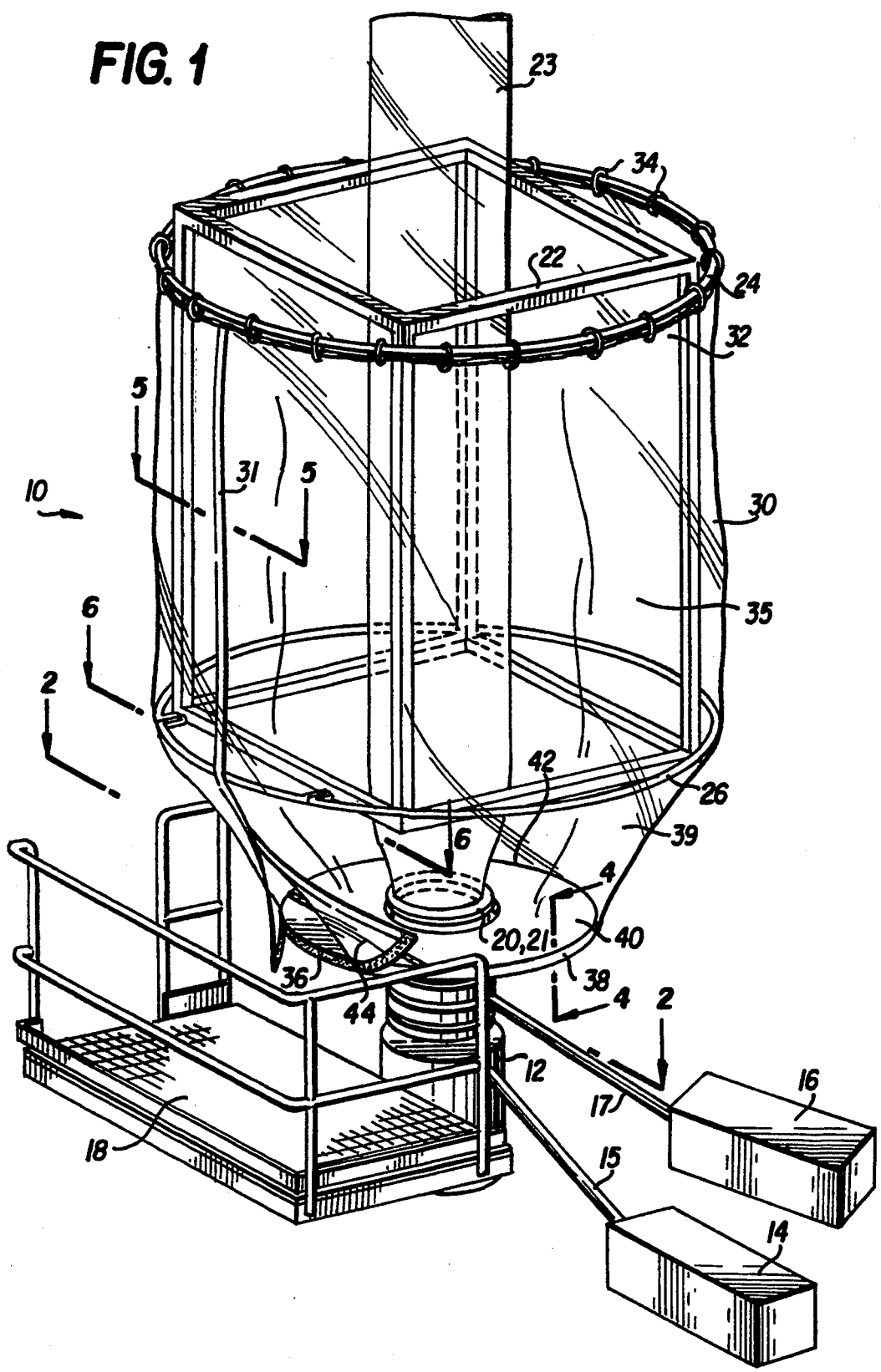
FIG. 1 is a perspective view of an enclosure structure assembled to a vertically-oriented blown film extruder apparatus, showing an enclosure support frame and enclosure shroud releasably affixed thereto, and a hinged annular platform positioned adjacent to the extruder die head.

Referring now in detail to the drawings wherein like parts are designated by like reference numerals throughout, there is illustrated in FIG. 1 a perspective view of an enclosure structure 10 assembled to a vertically-oriented blown film extruder apparatus 12 of known design through which molten polymer from polymer feeders 14 and 16 is flowed by feed screws 15 and 17 under predetermined temperature and pressure conditions. A work stand 18 is positioned adjacent to the extruder apparatus 12 and an upwardly-directed extruder head or die 20 thereof, to enable access to the apparatus for set-up and adjustment, as well as for cleaning, repair and maintenance. A conventional air cooling ring 21 surrounds the die 20.

A shroud support frame 22 having a generally cubic shape and a vertical major axis is supported above and is coaxial with the extruder head 20. A blown film bubble 23 passes unimpeded through the shroud support frame 22 along the major axis thereof. The support frame 22 includes an upper circular support bar 24 formed of circular rod or tube securely mounted to the upper outside corners of the support frame 22 by a bolted or welded connection (not shown). The support frame 22 also includes a lower circular support bar 26 also formed of circular rod or tube and securely mounted to the lower outside corners of the support frame 22 in coaxial alignment with the upper support bar 24 by bolted or welded connections (not shown). The support bars 24, 26 are secured into coaxial alignment with the axis of the blown film bubble 23, which is coincidental with the vertical major axis of the support frame 22.

A shroud 30 made of a relatively thick flexible material sheet is suspended at its upper edge 32 from the upper support bar 24 by a plurality of support rings 34 slidably mounted thereto. Preferably, the sheet material is a transparent polyvinyl chloride (PVC) material having a thickness of about 10 mils. The shroud 30 is slidably extended about the full circumference of the upper support bar 26 so as to provide a wall portion which is fully draped about the support frame 22 and the lower support bar 26 to enclose a generally cylindrical space 35 between the support bars 24, 26. An additional shroud wall portion extends below the lower support bar 26 and terminates at a lower shroud edge 36 about the outer circumferential edge 38 of an annular platform 40 mounted coaxial to the extruder head 20. This additional shroud wall portion encloses a frusto-conical space 39 and is affixed to the edge 38 of platform 40 with a releasable closure, as will be more fully described hereafter.

A seam 31 extends along the full vertical extent of the shroud 30 to enable access to the enclosed cylindrical and frusto-conical spaces 35,39. The seam 31 is also closable with a releasable closure. In the fully extended and enclosing configuration, the shroud 30 substantially reduces or prevents uncontrolled intrusion of environmentally generated air currents to the unsolidified blown film bubble 23. Furthermore, it has been found that the cylindrical space 35 and the frusto-conical space 39 of the shroud of the present invention are devoid of those turbulent air currents and eddies inherently found in the corners of the prior art enclosure, thereby eliminating an important source of undesirable differential cooling which heretofore resulted in a blown film product having varying film thicknesses along its length and about its circumference. It is believed that this improvement results because the shroud is substantially equidistantly spaced from the periphery of the blown film bubble 23.

The annular platform 40 is made of a substantially rigid, heat insulative material which is dimensionally stable at the elevated temperatures generated by the extruder feeders 14, 16. Preferred materials include plywood or particle board having a minimum thickness of about 0.75 inches. Relatively thick and rigid insulative materials are preferred so that the annular platform 40 offers substantial loadbearing capability to support, for example, the weight of a technician making routine adjustments to the extruder head 20. As will be apparent to the skilled artisan, the heat insulative platform 40 substantially reduces or prevents the generation of uncontrolled convective air currents within the contiguous spaces 35, 39 heretofore created by the heat of the unshielded extruder feeders 14, 16. The platform 40 preferably includes a fixed portion 42 and a hinged panel portion 44.

With reference now to FIG. 2, the generally crescent-shaped panel portion 44 is attached to the fixed portion 42 by a hinge 46 running along a chord of the circular platform 40. Preferably, the platform. 40 is angularly oriented about its vertical axis relative to the extruder head 20 so that the hinge 46 is in parallel alignment with the forward edge 47 of the work stand 18. The hinged panel portion 44 pivots toward the extruder head 20, without overlapping it to a folded position denoted by dash-dot line 48, and in that position enables close-in access to the extruder die 12. As shown in FIG. 3, the hinged panel portion 44 is shown in its fully folded position after being pivoted about hinge 46 in the direction of arrow A from its unfolded position shown in dash-dot lines.

According to one preferred construction of the present invention which has been found effective to achieve the objectives of the invention, the minimum diameter of the cylindrical space 35 is equal to the sum of the maximum diameter of the film bubble 23 plus 72 inches, and the minimum diameter of the annular platform 40 is equal to the sum of the maximum diameter of the film bubble plus 24 inches. The shroud 30 may be spaced within a range of about 30 inches to about 50 inches from the outer circumference of the film bubble 23, but preferably is not less than 36 inches therefrom.

Referring now to FIG. 4, the circumferential edge 38 of the annular platform 40 is provided with a strip of hook-and-loop fastener material 50. The lower shroud edge 36 is provided with a strip of complementary hook-and-loop fastener material 52 for releasably connecting the lower shroud edge 36 to the circumferential edge 38. It is within the purview of the present invention that other releasable closures, such as snap closures, may be substituted for or augment the hook-and-loop closure. In like manner, and with reference to FIG. 5, the mating edges of the vertical seam 31 are joined together with the aforementioned closure means. In particular, a first shroud edge 54 having a strip of hook-and-loop material 56 affixed to an inwardly facing side of the shroud is releasably secured to a complementary strip of hook-and-loop material 58 affixed to a shroud edge 60 of an outwardly facing and overlapping side of the shroud.

Referring now to FIG. 6, the lower circular support bar 26 includes a fixed portion 62 and an arcuate hinged bar portion 64. More specifically, the arcuate hinged bar portion 64 is pivotably secured to the fixed portion 62 by a pair of hinge pins 66 supported by a pair of projections 68 extending along parallel chords in the plane of the support bar 26. The hinged bar portion 64 folds toward, without overlapping, the path of the blown film bubble 23 to a folded position denoted in dashed lines 70, and in that position enables close-in access to the extruder die 20. Preferably, the lower circular support bar 26 is angularly oriented about a vertical axis relative to the work stand 18 and the extruder head 20 so that the hinge pins 66 are in parallel alignment with the forward edge 47 of the work stand 18, thereby maximizing access to the extrusion apparatus. As shown in FIG. 7, the hinged bar portion 64 is shown being pivoted to its folded position after being rotated about hinge pins 66 in the direction of arrow B from its lowered position shown in dash-dot lines.

Prior to operation of the extrusion apparatus 12 and according to the invention, the hinged panel portion 44 and the hinged bar portion 64 are returned to their unfolded positions. After the shroud 30 is fully extended so as to be completely wrapped about the full circumferential extent of the support bars 24, 26, the vertical seam 31 is fully closed along its entire length and the bottom shroud edge 36 is affixed about the outer circumferential edge 38 of the annular platform 40, thereby isolating the contiguous spaces 35, 39 from convective air currents generated by the feeders 14, 16, the extruder apparatus 12, and from environmentally generated air currents. In its fully enclosed form, it has been found that the enclosure apparatus of the present invention substantially reduces the number of standing gauge bands and results in fewer film wrinkles and thus improved blown film quality. The extruder die 70 is readily accessed by opening the vertical seam 31 and the closure of the bottom shroud edge 36, followed by raising the hinged panel portion 44 and hinged bar portion 64 in the manner previously described.

Although a certain preferred embodiment of the invention has been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. Apparatus for enclosing a blown film bubble emerging along a vertical axis from a die of an extruder head surrounded by a cooling ring along a vertical axis comprising a shroud surrounding at least a portion of the bubble such that said bubble portion is substantially isolated from air currents, said shroud extending vertically upwardly from the extruder head, said shroud having upper and lower edges and being in spaced, non-contacting relation to said bubble, and a thermal insulator positioned about said extruder head and having an outer edge connected to the lower edge of the shroud, said thermal insulator comprising a sheet of insulating material extending outwardly from said cooling ring and being substantially concentric thereto.

2. Apparatus according to claim 1, wherein said shroud comprises a first wall positioned substantially equidistant from said bubble portion.

3. Apparatus according to claim 1, wherein said thermal insulator is stationary.

4. Apparatus according to claim 1, wherein said thermal insulator comprises an annular sheet of insulating material having a central opening therein through which the die and extruder head extends.

5. Apparatus according to claim 1, wherein said shroud is made of a flexible, transparent sheet material.

6. Apparatus according to claim 5, wherein said sheet material is a polymeric material having a thickness of 10 mils or greater.

7. Apparatus according to claim 1, including means positioned between the outer edge of the thermal insulator and the lower edge of the shroud for releasably fastening said outer edge to said lower edge.

8. Apparatus according to claim 7, wherein said releasable fastening means comprises hook-and-loop fasteners.

9. Apparatus according to claim 1, wherein the shroud is upwardly open at the upper edge thereof.

10. Apparatus according to claim 1, wherein said shroud comprises a first wall having a substantially circular cross-section, said first wall being positioned substantially concentrically with said bubble along said axis.

11. Apparatus according to claim 10, wherein said shroud further comprises a second wall having a substantially frusto-conical shape, said second wall being positioned substantially concentrically with said bubble along said axis.

12. Apparatus according to claim 10, wherein the first wall of the shroud is spaced from the bubble a distance of from 30 to 50 inches.

13. Apparatus according to claim 10, wherein the first wall of the shroud is spaced from the bubble a minimum distance of about 36 inches.

14. Apparatus for enclosing a blown film bubble emerging from an annular die of extruder head along a vertical axis comprising a shroud surrounding at least a portion of the bubble such that said bubble portion is substantially isolated from air currents, said shroud extending vertically from the extruder head, said shroud having upper and lower edges and being in spaced, non-contacting relation to said bubble, and a thermal insulator positioned about said extruder head and having an outer edge connected to the lower edge of the shroud, said shroud comprising a first wall having a substantially circular cross-section and said first and second walls being substantially concentric to said bubble along said axis, said thermal insulator comprising an annular sheet of insulating material having a central opening therein through which the die and extruder head extends.

15. Apparatus according to claim 14, wherein said insulating material is one of plywood and particle board.

16. Apparatus according to claim 14, wherein said insulator has a minimum diameter of the sum of about 24 inches plus the diameter of the bubble.

17. Apparatus for enclosing a blown film bubble emerging from an annular die of an extruder head along a vertical axis comprising a shroud surrounding at least a portion of the bubble and extending vertically upwardly from the extruder head, said shroud having upper and lower edges, and a thermal insulator positioned about said extruder head and having an outer edge connected to the lower edge of the shroud, said shroud comprising a first wall having a substantially circular cross-section, said first wall being positioned substantially concentrically with said bubble along said axis, said shroud further comprising a second wall having a substantially frusto-conical shape, said second wall being positioned substantially concentrically with said bubble along said axis, an upper circular support bar connected to the upper edge of the shroud and a lower circular support bar positioned between the first and second walls of the shroud.

18. Apparatus according to claim 17, wherein said lower support bar includes a hinged bar portion for permitting easier access to the die of the extruder head.

19. Apparatus according to claim 18, wherein said thermal insulator includes a hinged insulator portion aligned with the hinged bar portion for permitting easier access to the die of the extruder head.

20. Apparatus according to claim 19, wherein said shroud includes a seam in the first and second walls thereof aligned with the hinged bar and insulator portions for permitting access to the die through the shroud and means for opening and reclosing said seam.

21. Apparatus according to claim 20, wherein said opening and reclosing means comprises hook-and-loop fasteners positioned along said seam.

22. An enclosure for a blown film bubble emerging from a die of a blown film extruder along a vertical axis comprising a shroud made of a flexible transparent plastic sheet material surrounding a portion of the bubble such that said bubble portion is substantially isolated from air currents, said shroud having a cylindrical wall portion and a frusto-conical wall portion, said wall portions being substantially concentric with the vertical axis of extrusion of the bubble, said shroud having upper and lower cylindrical edges and being in spaced, non-contacting relation to said bubble, an annular thermal insulator comprising a sheet of insulating material and having an outer circumferential edge and a central opening therein positioned around the die, the lower edge of the shroud being connected to the outer edge of the insulator and the upper edge of the shroud being upwardly open.

23. An enclosure for a blown film bubble emerging from a die of a blown film extruder along a vertical axis comprising a shroud made of a flexible transparent plastic sheet material surrounding a portion of the bubble, said shroud having a cylindrical wall portion and a frusto-conical wall portion, said wall portions being substantially concentric with the vertical axis of extrusion of the bubble, said shroud having upper and lower cylindrical edges, an annular thermal insulator having an outer circumferential edge and a central opening therein positioned around the die, the lower edge of the shroud being connected to the outer edge of the insulator and the upper edge of the shroud being upwardly open, a frame positioned over the extruder, upper and lower support bars affixed to said frame for supporting the shroud from the frame, a reclosable vertical seam extending along the wall portions of the shroud, said lower support bar and said insulator having hinged portions aligned with said vertical seam for permitting access to said die.

* * * * *